United States Patent [19]

Cummins et al.

[11] Patent Number: 5,307,644
[45] Date of Patent: May 3, 1994

[54] METHOD AND ELECTRONIC DEVICE FOR CONTROLLING ENGINE FAN

[75] Inventors: James M. Cummins, Dearborn; John I. Snoke, Royal Oak; Gene R. Burnham, Lincoln Park, all of Mich.

[73] Assignee: Ford Motor Company, Dearborn, Mich.

[21] Appl. No.: 968,083

[22] Filed: Oct. 28, 1992

Related U.S. Application Data

[63] Continuation-in-part of Ser. No. 857,900, Mar. 26, 1992, abandoned.

[51] Int. Cl.$^5$ .............................................. B60H 3/04
[52] U.S. Cl. .................................... 62/133; 62/183; 123/41.12; 236/35
[58] Field of Search ............... 62/133, 181, 183, 184, 62/323.1; 236/35; 165/39; 123/41.05, 41.12, 41.42

[56] References Cited

U.S. PATENT DOCUMENTS

| | | | |
|---|---|---|---|
| 4,425,766 | 1/1984 | Claypole | 62/133 |
| 4,546,742 | 10/1985 | Sturges | 123/41.05 |
| 4,651,922 | 3/1987 | Noba | 236/35 |
| 4,779,577 | 10/1988 | Ritter et al. | 123/41.05 |
| 4,804,139 | 2/1989 | Bier | 236/35 |
| 4,848,100 | 7/1989 | Barthel et al. | 62/212 |
| 4,930,320 | 6/1990 | Ide et al. | 62/184 |
| 5,018,484 | 5/1991 | Naitoh | 123/41.12 |
| 5,144,916 | 9/1992 | Yoshida et al. | 123/41.12 |

FOREIGN PATENT DOCUMENTS 58-39513  3/1983  Japan .
2142445  1/1985  United Kingdom .

*Primary Examiner*—Harry B. Tanner
*Attorney, Agent, or Firm*—Roger L. May; Raymond L. Coppiellie

[57] ABSTRACT

An electronic engine fan control device is disclosed. The control device includes means for detecting engine coolant temperature, operation of the vehicle air conditioning load, and vehicle road speed. The control device also includes means for generating first and second temperature signals in response to engine coolant temperature. The control device further includes override signal generating means for generating first and second override signal under certain temperature, or certain load and speed conditions. The control device finally includes means for comparing the first and second temperature signals and the first and second override signals for generating a control signal to operate the vehicle fan. A method for controlling an engine fan is also disclosed including the steps of detecting engine coolant temperature, air conditioning load and road speed and generating corresponding signals. The method further includes the steps of comparing the temperature, load and speed signals to preselected values and generating a control signal to operate the engine fan.

20 Claims, 4 Drawing Sheets

LOGIC SEQUENCE

| $E_k$ | $E_f$ | $E_o$ | T |
|---|---|---|---|
| 0V | 5.3V | 8V | $T < T_1$ |
| 4V | 5.3V | 8V | $T_1 < T < T_2$ |
| 8V | 5.3→2.7V | 0V | $T > T_2$ |
| 4V | 2.7V | 0V | $T_1 < T < T_2$ |
| 0V | 2.7→5.3V | 8V | $T < T_1$ | ns
METHOD AND ELECTRONIC DEVICE FOR CONTROLLING ENGINE FAN

CROSS REFERENCE TO RELATED APPLICATIONS

This application is a continuation-in-part of co-pending U.S application Ser. No. 857,900 filed Mar. 26, 1992, abandoned. The applications have, at all times relevant hereto, been commonly owned.

TECHNICAL FIELD

This invention relates generally to the operation of cooling fans in motor vehicles. Specifically, this invention relates to a method and electronic circuit for controlling the operation of an engine fan.

BACKGROUND ART

Conventional motor vehicles are generally designed with an engine cooling system including a liquid coolant that circulates about the engine block to transfer heat away from the engine during operation. The cooling system also generally includes a radiator to disperse the heat absorbed by the liquid coolant. Many motor vehicles are also designed with an air conditioning system that includes an air conditioning coolant condenser, such as Freon, which also operates to disperse heat.

To facilitate the dispersion of heat from vehicle engine cooling and air conditioning systems, motor vehicles generally include a fan to drive air over the radiator and condenser at lower vehicle speeds where air flow over the radiator and condenser is minimal. The fan can be engaged by a fan clutch independently responsive to either engine coolant temperature or air conditioning coolant gas pressure within the condenser.

In operation, however, this design can suffer from various problems. For example, the fan is generally engaged only as long as the engine temperature or condenser pressure exceed given set points. Thereafter, the fan is disengaged and the engine temperature or condenser pressure again begin to increase to the point where the fan is once again engaged. During low speed operation of the vehicle, and especially during idle conditions, this can result in excessive cycling of the fan mechanism as well as frequent temperature and condenser pressure switch failure. Excessive cycling problems are generally compounded during operation of the air conditioning system when either the engine temperature or condenser pressure can independently cause the cooling fan to be engaged.

Switch failure, as well as temperature or pressure detector failure, can result in rapid engine or air conditioning system overheating. Excessive cycling of the fan mechanism reduces fan mechanism lifespan and overall engine fuel economy and may result in increased difficulty in system troubleshooting. Inadequate cooling can secondarily result in poor reliability of system components. Finally, conventional engine fans lack controlled responsiveness to the cooling requirements of other vehicle system including transmission fluid, power steering fluid and especially air-to-air intercoolers.

Various systems have been implemented in an effort to address some of these problems. One such system is disclosed in U.S. Pat. No. 4,425,766 issued to Claypole. Claypole discloses a motor vehicle cooling fan power management system comprising a microprocessor based electronic control unit for engine fan control in response to engine temperature, engine speed, vehicle road speed and the on/off state of the air conditioning system. Depending on the cooling needs of the engine, the duration of a constant voltage signal to the engine cooling fan is varied via a pulse-width modulator. The voltage signal is directly operative to drive the engine cooling fan at variable speeds.

However, Claypole fails to overcome over-heating problems associated with failure of temperature or pressure switches and detectors. Claypole also fails to address control of the cooling requirements of other vehicle systems including transmission fluid, power steering fluid and air-to-air intercoolers. Moreover, the use of microprocessors increases the expense of the system and, absent additional logic circuits, limits the number of inputs for the purposes of controlling fan operation based on other vehicle operating systems. The use of microprocessors also increases the electromagnetic radiation of the system thereby creating greater interference with other electronic vehicle systems.

Additionally, the Claypole system discloses an engine fan driven directly by a voltage signal from a pulse width modulator. As a result, the Claypole system is operable only with smaller motor vehicles, such as passenger cars, which do not utilize engine cooling fans having high horsepower requirements. Larger motor vehicles having engine cooling fans with high horsepower requirements, such as heavy duty trucks, would suffer significantly reduced engine efficiency upon operation of the engine cooling fan under the Claypole system. Finally, such a pulse width modulation system is neither compatible with, nor directed to the efficient control of an engine fan clutch.

U.S. Pat. No. 4,546,742 issued to Sturges discloses a temperature control system for an internal combustion engine having a variable speed cooling fan. The Sturges system utilizes a pulse width modulation voltage signal generator to alternatively open and close a solenoid valve thereby controlling a fluid pressure level operative to drive the cooling fan. As a result, however, the Sturges system is neither compatible with, nor directed to the efficient control of an engine fan clutch.

U.K. Patent Application No. 2,142,445 A discloses a cooling-fan driving control system for a vehicle utilizing an electronic control unit for controlling engine fan clutch and fan operation responsive to engine coolant temperature, engine speed and engine load. The system utilizes digital logic to engage the engine fan when coolant temperature exceeds a high selected temperature, and to disengage the engine fan when coolant temperature is below a low selected temperature. When coolant temperature is between the high and low selected temperatures, the engine fan is controlled solely in response to engine speed and load.

U.S. Pat. No. 4,804,139 issued to Bier discloses a cooling system for water-cooled vehicle engines that utilizes dual engine coolant temperature detectors and an override responsive to temperature detector failure to control engine fan operation. However, Bier is a microprocessor based system. As such, it includes the attendant problems associated therewith such as added expense, limited input, and increased electromagnetic radiation.

U.S. Pat. No. 4,930,320 issued to Ide et al discloses a cooling fan controlling apparatus for vehicle with air conditioner. Ide et al utilizes a digital electronic control unit responsive to the vehicle air conditioning system to control engine fan operation. U.S. Pat. No. 4,651,922 issued to Noba and Japanese Patent No. 58-39513 disclose engine fan control systems utilizing dual cooling fans for greater cooling capacity. U.S. Pat. No. 4,848,100 issued to Barthel et al discloses a system for controlling refrigerant flow in an air conditioning system.

The prior art devices discussed above provide a general background in respect of the control of engine cooling fans. These devices suffer variously from lack of universal response to multiple vehicle systems requiring cooling, lack of compatibility with a variety of motor vehicle cooling systems, and complex components.

SUMMARY OF THE INVENTION

It is an object of the present invention to provide a method for efficiently controlling a vehicle engine cooling fan responsive to a variety of vehicle systems requiring cooling and an electronic control device for carrying out the method.

Another object of the present invention is to provide a method and apparatus for efficiently controlling vehicle engine cooling fans responsive to a variety of vehicle systems requiring cooling that is simple in design, easy to manufacture, constructed from conventional components, low maintenance, durable, simplifies troubleshooting and is compatible with direct drive or clutch driven engine cooling fans.

Yet another object of the present invention is to provide a method and apparatus for efficiently controlling a vehicle engine cooling fan responsive to a variety of vehicle systems requiring cooling that extends fan mechanism lifespan and increases engine fuel economy.

It is a further object of the present invention to provide a method and apparatus for efficiently controlling a vehicle engine cooling fan responsive to a variety of vehicle systems requiring cooling that improves the reliability of both the vehicle systems requiring cooling and the control system itself.

Still another object of the present invention is to provide a method and apparatus for efficiently controlling a vehicle engine cooling fan responsive to a variety of vehicle systems requiring cooling having an override mechanism in case of component failure.

In carrying out the above objects, the electronic control circuit of the present invention is comprised generally of the components described in operation below.

Heat sensing means is provided for detecting the temperature of the engine coolant and generating a coolant temperature signal proportional thereto. Threshold temperature signal generating means is utilized to receive the coolant temperature signal and generate a threshold temperature signal indicative of whether the coolant temperature exceeds a selected temperature.

There is further provided road speed sensing means and load sensing means for detecting the motor vehicle road speed and the operation of selected vehicle operating systems, respectively. As more fully disclosed herein, the speed sensing means generates a speed signal proportional to the motor vehicle road speed. Similarly, the load sensing means generates a load signal corresponding to the detected load on the engine.

Override signal generating means is also provided to receive the speed and load signals and generate an override signal indicating whether the vehicle road speed is less than a selected speed when the selected vehicle operating system is engaged. Control signal generating means is further provided to receive the threshold temperature signal and the override signal and generate a control signal operative to engage and disengage the vehicle fan clutch and thus the cooling fan in response to predetermined temperature, vehicle road speed and engine load conditions.

These and other objects, features and advantages of the present invention are readily apparent from the following detailed description of the best mode for carrying out the invention when taken in connection with the accompanying drawings.

BEST MODE FOR CARRYING OUT THE INVENTION

The Electronic Fan Control Circuit

Figure 1:
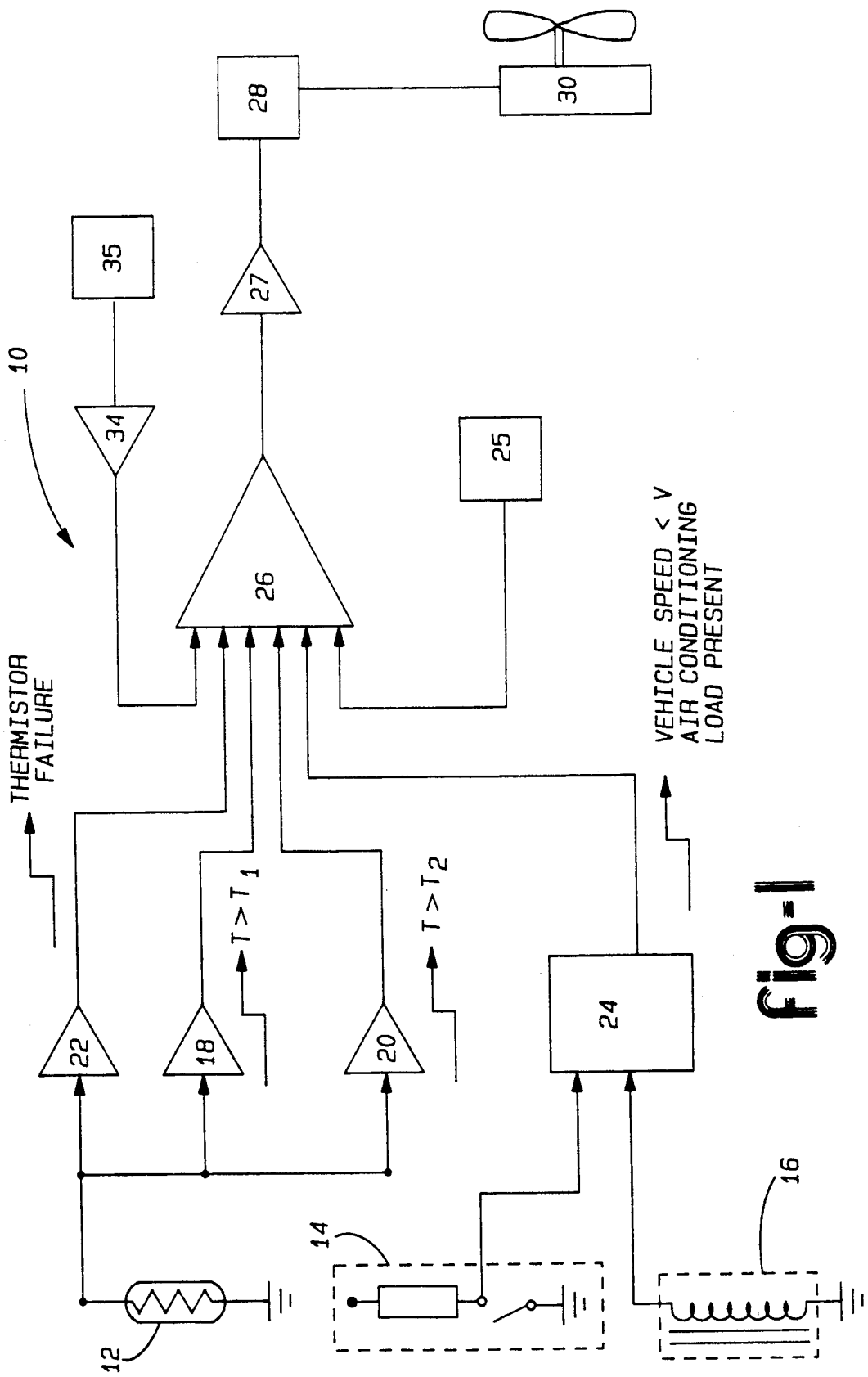
FIG. 1 is a simplified logic diagram of the operation of the electronic control circuit of the present invention.

Referring now to FIG. 1, the control circuit of the present invention is shown in the form of a logic diagram, generally indicated by reference numeral 10. The circuit comprises a thermistor 12, a load sensor 14, and a vehicle road speed sensor 16.

The thermistor 12 provides a heat sensing means for detecting the temperature of the engine coolant and for generating a coolant temperature signal proportional thereto. Thermistor 12 is of conventional design and preferably has a negative temperature coefficient thereby providing a lower resistance as engine coolant temperature increases. It should be noted, however, that other types of thermistors 12 well known in the art may, of course, be readily substituted.

Load sensor 14 is of conventional design and provides load sensing means for detecting the operation of selected vehicle operating systems which cause a resultant load on the engine. In the case of air conditioning systems, for example, sensor 14 is used to detect the operation of the system and to generate a load signal when the air conditioning system is engaged. Applicants recognize that load sensor 14 may be used not only to detect the presence of an engine load but to generate a measured signal proportional to the resulting load on the engine.

The vehicle speed sensor 16 provides speed sensing means for detecting vehicle road speed and generating a speed signal proportional thereto. The road speed sensor 16 is a conventional variable reluctance sensor preferably located in the rear of the vehicle transmission system.

Figure 2:
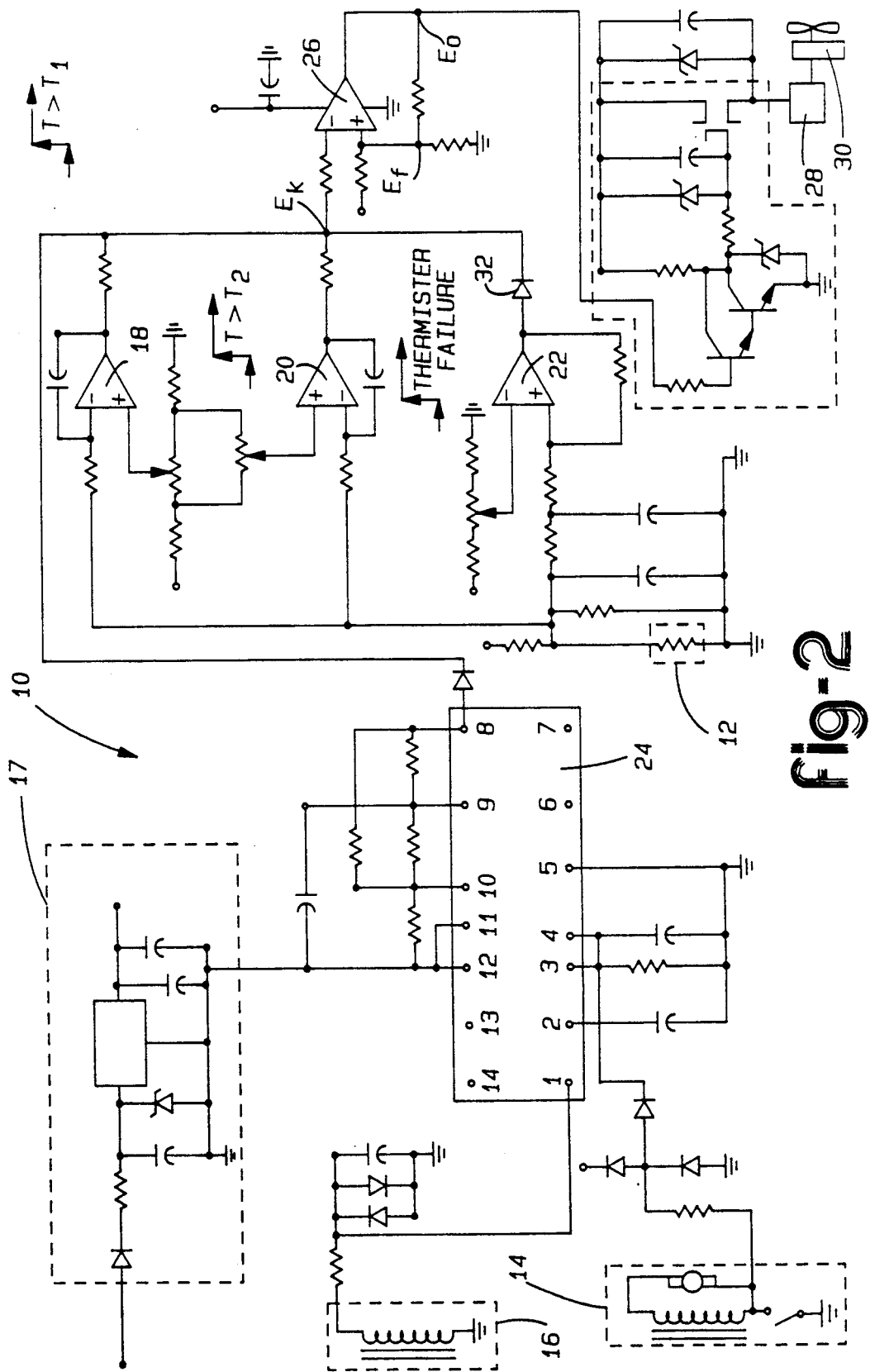
FIG. 2 is a detailed schematic diagram of the electronic control circuit of the present invention.

Still referring to FIG. 1, the electronic control circuit 10 of the present invention is shown including a first temperature detector 18. Temperature detector 18 provides a first temperature signal generating means for receiving the coolant temperature signal of thermistor 12 and generating a first temperature signal indicating whether the coolant temperature exceeds a first predetermined temperature, $T_1$. It is recognized that temperature $T_1$ may be any selected temperature depending on the vehicle and engine specifications. As shown in FIG. 2, the first temperature detector 18 is preferably a comparator of well known design, such as a conventional operational amplifier.

Still referring to FIG. 1, the electronic fan control circuit 10 of the present invention also comprises a second temperature detector 20. Temperature detector 20 provides a second temperature signal generating means for receiving the coolant temperature signal of thermistor 12 and generating a second temperature signal indicating whether the engine coolant temperature exceeds a second predetermined temperature, $T_2$. As shown in FIG. 2, second temperature detector 20 is also preferably a comparator of well known design, such as a conventional operational amplifier.

In operation, applicants have generally found it preferable that $T_2$ exceed $T_1$. However, it is again recognized that temperature $T_2$ may be any temperature depending on the specific vehicle and engine involved. In fact, depending on the parameters sought to be measured and responded to, it is anticipated that only one "threshold" temperature detector may be used to provide input to the circuit.

Once again referring to FIG. 1, the electronic fan control circuit 10 of the present invention further comprises an optional malfunction detector 22. Detector 22 provides a first override signal generating means for receiving the coolant temperature signal of thermistor 12 and generating a first override signal indicating whether the thermistor 12 is functioning properly. It is recognized that a "malfunction" of the thermistor 12 includes any operation failure in either a shorted or open state. As shown in FIG. 2, malfunction detector 22 is also of a conventional operational amplifier type design.

The electronic fan control circuit 10 also comprises a programmable frequency-to-voltage switch 24. Switch 24 provides a second override signal generating means for receiving the load and speed signals from load sensor 14 and the vehicle speed sensor 16, respectively, and generating a secondary override signal under specified conditions. For example, when used to detect an engaged air conditioning system, switch 24 will generate a secondary override signal when the air conditioning system is engaged and the vehicle road speed is less than a predetermined speed, V. Of course, it is again recognized that speed V may vary depending on the specific vehicle and engine involved. However, the predetermined speed V must be the minimum speed at which air flow over the condenser due to vehicle movement is sufficient to provide the required condenser cooling without need for additional cooling capacity from the vehicle engine fan.

Any number of conventional circuits well known in the art may be used for the programmable frequency-to-voltage switch 24. As shown in FIG. 2, the circuit chip designated LM2907 has been employed in the present invention. As is readily apparent, the programmable frequency switch 24 may also be set to generate additional or alternative override signals under a variety of other air conditioning load and vehicle speed operating conditions. The programmable frequency switch 24 may also be replaced or supplemented with an ordinary timing mechanism 25 well known in the art to accommodate the previously described or additional engine load and vehicle road speed operating conditions.

Still referring to FIG. 1, the electronic fan control circuit 10 of the present invention also comprises a decision comparator 26. Decision comparator 26 provides a control signal generating means for receiving the first and second temperature signals from temperature detectors 18 and 20, respectively, as well as the first and second override signals from detector 22 and programmable frequency switch 24, respectively. Decision comparator 26 further provides a control signal generating means for generating a control signal operative to engage and disengage the vehicle fan clutch 28 and cooling fan 30 in response to predetermined engine coolant temperature, vehicle road speed and engine load conditions. Any number of conventional comparators well known in the art, such as a conventional operational amplifier, may be used for the decision comparator 26. As shown in FIG. 2, the circuit chip designated LM2902 has been employed in the present invention.

Operation of The Circuit

With reference to FIGS. 1-4, generally, and FIG. 5, specifically, the electronic fan control circuit 10 of the present invention will now be described in operation.

At the outset, it is recognized that in the preferred embodiment of the present invention, two independent override conditions exist wherein the fan clutch 28 and fan 30 will automatically be engaged to force air over the vehicle condenser and radiator—regardless of other operating conditions.

Figure 5:
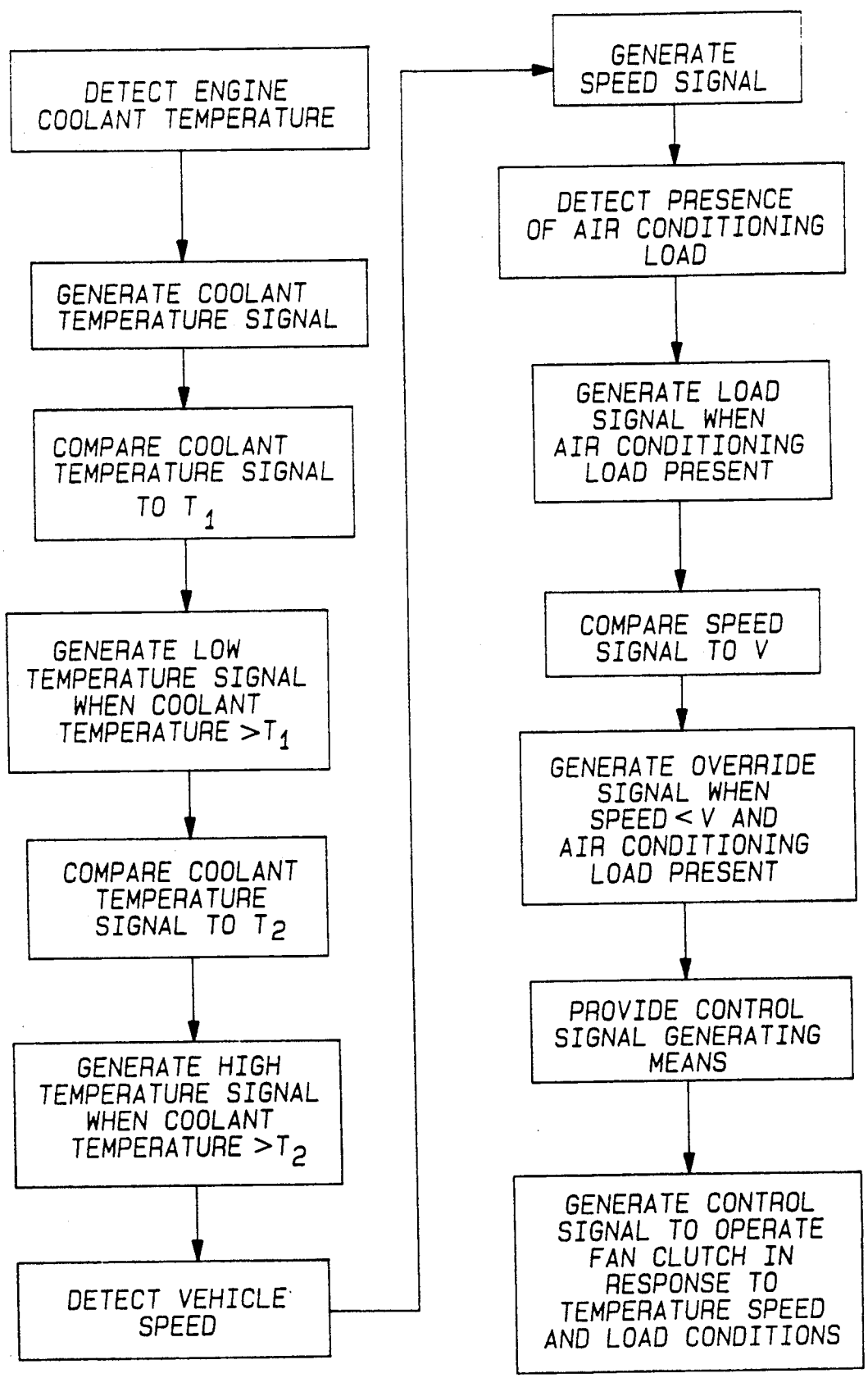
FIG. 5 is a block diagram of the method steps of the present invention.

Referring to FIG. 5, the first override condition exists whenever the thermistor 12 malfunctions and generates a coolant temperature signal to the malfunction detector 22 indicating such a condition. In this situation, the engine cooling system must operate without the benefit of temperature information feedback and is unable to determine whether or not engine coolant temperature is within normal operating parameters. To prevent possible engine overheating, the malfunction detector 22 generates a first override signal to the decision comparator 26. Decision comparator 26 then generates a control signal operative to engage the fan clutch 28 and fan 30 until such time as the thermistor 12 becomes properly operable or is replaced.

The second override condition exists whenever (1) the load sensor 14 detects that the air conditioning system is engaged and generates a load signal to the programmable frequency switch 24 indicating that condition; and (2) the vehicle speed sensor 16 detects that the vehicle speed is less than the predetermined speed V and generates a speed signal to the programmable frequency switch 24 indicating that condition. As was previously described, the predetermined speed V is the vehicle road speed below which air flow over the condenser due to vehicle movement is insufficient to provide the necessary cooling capacity to the condenser. In such a situation, the programmable frequency switch 24 then generates a second override signal to the decision comparator 26. Decision comparator 26 then generates a control signal operative to engage the fan clutch 28 and fan 30 until such time as either the air conditioning system is disengaged or the vehicle road speed exceeds the predetermined speed V.

It should be recognized that the above override conditions are independently detected and responded to. Thus, in describing the operation of the remaining components of the invention, it is assumed that neither of the above-described override conditions exist. The circuit operation will also be described with reference to two temperature detectors 18 and 20 used to generate respective temperature signals when the coolant temperature exceeds predetermined temperatures $T_1$ and $T_2$, respectively. $T_1$ will also be used as the base reference point wherein $T_1 < T_2$.

When thermistor 12 generates a coolant temperature signal indicating that the engine coolant temperature has exceeded the first predetermined temperature $T_1$, first temperature detector 18 then generates a corresponding first temperature signal for receipt by the decision comparator 26. Similarly, when thermistor 12 generates a coolant temperature signal indicating that the engine coolant temperature has exceeded the second predetermined temperature $T_2$, second temperature detector 20 generates a corresponding second temperature signal for receipt by the decision comparator 26. Significantly, it is recognized that because there are two coolant temperature inputs, decision comparator 26 will only generate a control signal after it has polled both temperature detectors 18 and 20 and received and analyzed the corresponding temperature signals. The control circuit of the present invention is thus a continuous input circuit wherein the specified temperature, road speed and load conditions are continuously monitored.

Figures 3, 4:
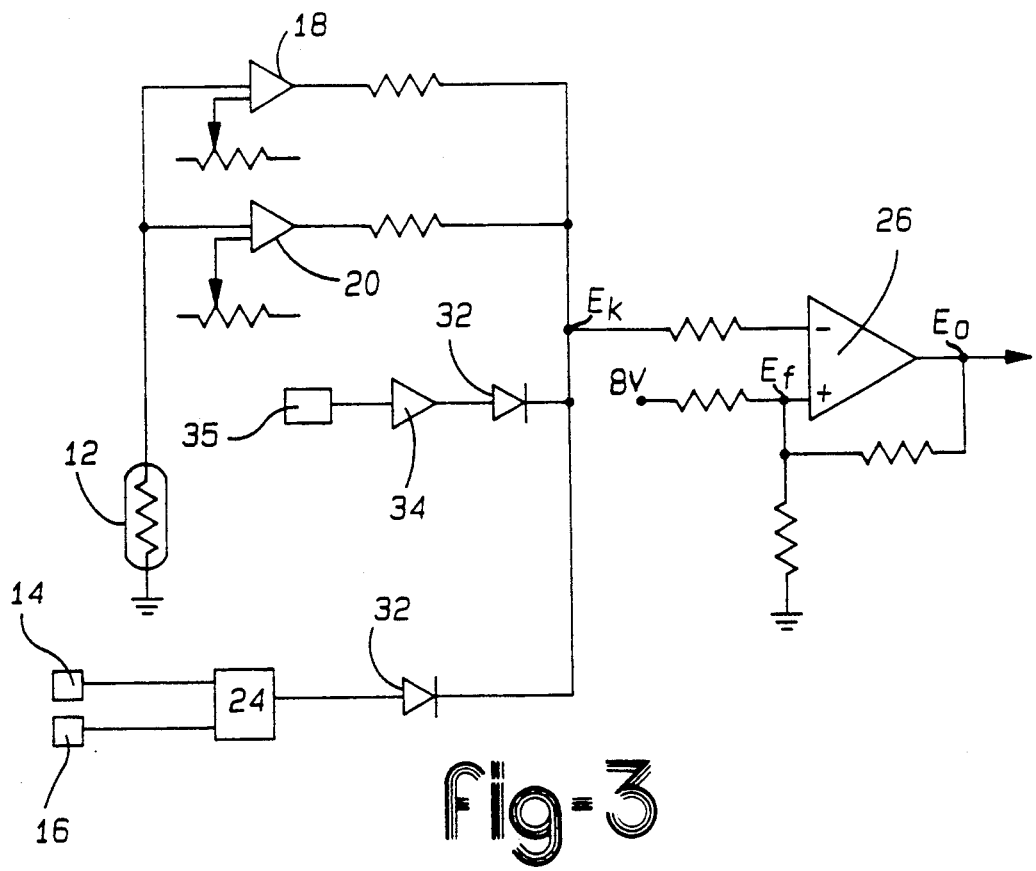
FIG. 3 is a simplified schematic diagram of the electronic control circuit of the present invention.
FIG. 4 is a logic sequence table of the operation of the electronic control circuit of the present invention.

In operation, decision comparator 26 is thus designed to generate a control signal operative to maintain engagement of the fan clutch 28 and fan 30 when the detected engine coolant temperature is greater than $T_2$. When, however, the detected engine coolant temperature falls below $T_1$, decision comparator 26 is designed to generate a control signal operative to disengage the fan clutch 28 and fan 30 until such time as the engine coolant temperature exceeds $T_2$. A more detailed logic sequence of the control circuit of the present invention is shown in FIG. 4.

As previously indicated, the control circuit 10 of the present invention is a continuously polling, or analogue circuit. Such a design has a number of inherent advantages over control circuits based on digital technology. One such advantage is that the control circuit 10 of the present invention can accommodate an unlimited amount of inputs from various vehicle operating systems. In contrast, similar digital control circuits eventually require additional microprocessor units to accommodate additional vehicle operating system inputs. Moreover, digital control circuits typically generate high levels of electromagnetic radiation that can interfere with the operation of other electronic based vehicle systems. The analogue nature of the control circuit 10 of the present invention reduces the amount of electromagnetic radiation from the circuit, thereby reducing interference with the operation of other electronic vehicle systems.

The Components

Referring now to FIG. 2, a detailed schematic drawing of the electronic fan control circuit 10 of the present invention is shown. As discussed above, the temperature detectors 18 and 20 and malfunction detector 22 are all shown to be of conventional operational amplifier type design. Additionally, the programmable frequency switch 24 and decision comparator 26 are shown to be conventional comparators in the form of standard operational amplifiers designated by circuit chips LM2907 and LM2902, respectively. In conjunction with the programmable frequency switch 24, FIG. 2 also shows the electrical components necessary for an approximate 5 mile per hour hysteresis to prevent excessive engagement and disengagement, or "hunting", of the fan clutch 28 at the vehicle speed chosen for the predetermined speed V. FIG. 2 further depicts the detailed schematic of a voltage regulator 17 for regulating and filtering vehicle battery voltage to a constant 8 volts DC, as well as a power amplifier 27 to amplify the power of the control signal generated by the decision comparator 26.

The Control Circuit Logic Sequence

Referring now to FIGS. 3 and 4, a simplified schematic drawing of the electronic fan control circuit 10 is shown along with a logic sequence table summarizing the operation described above. As shown in FIGS. 3 and 4, the voltage at the common output point of each of the operational amplifiers (i.e. temperature detectors 18 and 20, and malfunction detector 22) is indicated generally by the reference $E_k$. The reference voltage and output voltage of decision comparator 26 are similarly indicated by $E_f$ and $E_o$, respectively.

As set forth above, the logic sequence assumes that neither of the two override conditions involving a malfunctioning thermistor 12 or the presence of an air conditioning load at low vehicle speeds exist. In the first scenario depicted in FIG. 4, the engine coolant temperature is less than the first predetermined temperature $T_1$. This is the base reference point previously described.

Under these conditions, both the first temperature detector 18 and the second temperature detector 20 generate "off" signals (i.e., 0 volts). Therefore, the voltage at $E_k$ is 0 volts. Due to the 47K ohm series connected voltage divider resistors, the reference voltage $E_f$ is approximately 4 volts (i.e., 5.3 volts). When $E_k$ is less than $E_f$, the decision comparator 26 generates an "on" signal and the output voltage $E_o$ is 8 volts. Because of the inverted design of the electronic fan control device 10, an "on" signal generated by the decision comparator corresponds to the fan clutch 28 and fan 30 being disengaged.

As the engine coolant temperature increases to a value between the first and second predetermined temperatures $T_1$ and $T_2$, the first temperature detector 18 generates an "on" signal (i.e., 8 volts), while the second temperature detector 20 continues to emit an "off" signal (i.e., 0 volts). Due to the 100k ohm series connected voltage divider resistors, the voltage at $E_k$ then increases to 4 volts. As $E_k$ is still less than the reference voltage $E_f$, the output voltage $E_o$ of the decision comparator remains 8 volts and the fan clutch 28 and fan 30 remain disengaged.

When the engine coolant temperature exceeds the second predetermined temperature $T_2$, both the first temperature detector 18 and the second temperature detector 20 generate "on" signals (i.e., 8 volts). Due to the 100K ohm series connected voltage divider resistors, the voltage at $E_k$ then becomes 8 volts. As $E_k$ now exceeds $E_f$, the output voltage $E_o$ is converted to 0 volts pursuant to the function of the decision comparator 26. Accordingly, the fan clutch 28 and fan 30 are engaged. Moreover, due to the 47K ohm series connected voltage divider resistors, the voltage at $E_f$ falls to approximately 2 volts (i.e., 2.7 volts).

As the engine coolant temperature falls to a value between the first and second predetermined temperatures $T_1$ and $T_2$, the second temperature detector 20 generates an "off" signal (i.e., 0 volts), while the first temperature detector 18 continues to generate an "on"

signal (i.e., 8 volts). Due to the 100K ohm series connected voltage divider resistors, the voltage at $E_k$ then returns to 4 volts. As $E_k$ still exceeds $E_f$, the output voltage $E_o$ remains at 0 volts and the fan clutch 28 and fan 30 remain engaged.

Finally, when the engine coolant temperature falls below the first predetermined temperature $T_1$, both the first temperature detector 18 and the second temperature detector 20 generate "off" signals (i.e., 0 volts). As a result, the voltage at $E_k$ falls to 0 volts. As $E_k$ is now less than $E_f$, the output voltage $E_o$ is converted to 8 volts pursuant to the function of the decision comparator 26 and the fan clutch 28 and fan 30 are disengaged. Moreover, due to the 47K ohm series connected voltage divider resistors, the voltage at $E_f$ increases to approximately 4 volts (i.e., 5.3 volts) to return conditions to those of the base reference point.

FIG. 3 also shows the programmable frequency switch 24 in simplified schematic. The programmable frequency switch 24 is isolated from the voltage $E_k$ at the common output point previously described by a conventional diode 32. When the programmable frequency switch 24 generates a second override signal, the diode 32 allows that signal to pass freely to the common output point. However, when the programmable frequency switch 24 does not generate a second override signal, the diode 32 prevents electrical communication between the programmable frequency switch 24 and the common output point.

Still referring to FIG. 3, a generic detector 34 is also shown. The generic detector 34 provides a third override signal generating means for generating a third override signal in response to any other vehicle system 35 that may require cooling capacity such as transmission fluid, power steering fluid or a air-to-air intercooler. As is readily apparent, any number of generic detectors 34 may be incorporated as are necessary to handle any of a variety of vehicle systems 35 which may require cooling capacity. The generic detector 34 generates a third override signal whenever the relevant vehicle operating system temperature exceeds a third predetermined temperature, $T_3$. The generic detector 34 is once again of conventional operational amplifier type design. Like the programmable frequency switch 24, the generic detector 34 is also isolated from the common output point previously described by a conventional diode 32.

The preceding description of the electronic control circuit 10 of the present invention, its operation, components and logic sequence, discusses the circuit 10 in conjunction with a fan clutch 28 and a fan 30. It should be noted that the fan clutch 28 may be either magnetic or air driven. In either configuration, the control signal generated by the circuit 10 of the present invention is operative to energize a solenoid. With an air driven clutch, the solenoid operates a valve (not shown), thereby releasing pressurized air necessary to operate the fan clutch 28. With a magnetic clutch, the solenoid operates the fan clutch 28 directly. In either configuration, the fan clutch 28 is energized to drive the fan 30 at a constant speed.

It should be readily apparent that the control circuit 10 of the present invention may also drive the fan 30 directly, without utilizing a fan clutch 28. In such a configuration, the fan 30 may be either electrically or hydraulically controlled. With an electric fan, the control signal generated by the circuit 10 is simply operative to energize the fan 30 directly. With a hydraulic fan, the control signal generated by the circuit 10 is operative to energize a solenoid valve (not shown), thereby releasing hydraulic fluid necessary to operate a hydraulic fan motor to drive the fan 30. Once again, in either configuration, the fan 30 is driven at a constant speed.

While the best mode for carrying out the present invention has been described in detail, those familiar with the art to which this invention relates will recognize various alternative designs and embodiments for practicing the invention as defined by the following claims.

We claim:

1. In a motor vehicle having an engine, a coolant system, and a fan, an analogue electronic fan control circuit comprising:
   heat sensing means for detecting the temperature of said coolant and generating a coolant temperature signal proportional thereto;
   threshold temperature signal generating means in electrical contact with said heat sensing means for receiving the coolant temperature signal and generating a threshold temperature signal when the coolant temperature exceeds a selected temperature;
   speed sensing means for detecting the motor vehicle road speed and generating a speed signal proportional thereto;
   load sensing means for detecting the presence of selected engine loads and generating a corresponding load signal;
   override signal generating means in electrical contact with said load sensing means and said speed sensing means for receiving said speed and load signals and generating an override signal when the vehicle speed is less than a selected speed and selected engine loads are present; and
   control signal generating means in electrical contact with said threshold temperature signal generating means and said override signal generating means for receiving and distinguishing input signals, including said threshold temperature signal and said override signal and generating a control signal in response to at least one of said input signals operative to engage and drive the fan at a constant speed, such that the required engine cooling is achieved.

2. A control circuit as in claim 1 wherein said fan is electrically driven.

3. A control circuit as in claim 1 wherein said fan is hydraulically driven.

4. A control circuit as in claim 1 wherein said load sensing means comprises an air conditioning system sensor.

5. A control circuit as in claim 1 wherein said heat sensing means comprises a thermistor.

6. A control circuit as in claim 1 wherein said speed sensing means comprises a variable reluctance road speed sensor.

7. A control circuit as in claim 1 wherein said override signal generating means comprises a programmable frequency switch.

8. A control circuit as in claim 1 wherein said control signal generating means comprises a decision comparator.

9. A control circuit as in claim 1 wherein said threshold signal generating means comprises an operational amplifier.

10. A control circuit as in claim 1 further comprising:

a voltage regulator in electrical contact with said heat sensing means, said threshold temperature signal generating means, said override signal generating means, and said control signal generating means for converting input voltage to 8 volts DC; and secondary heat sensing means in electrical contact with said control signal generating means for detecting a selected vehicle operating system temperature and generating a second override signal for receipt by said control signal generating means when said selected system temperature exceeds a second selected temperature.

11. A control circuit as in claim 10 wherein said secondary heat sensing means comprises a power steering fluid temperature detector.

12. A control circuit as in claim 10 wherein said secondary heat sensing means comprises a transmission fluid temperature detector.

13. A control circuit as in claim 10 wherein said secondary heat sensing means comprises an air-to-air intercooler temperature detector.

14. A control circuit as in claim 10, further comprising third override signal generating means in electrical contact with said control signal generating means for receiving said coolant temperature signal and generating a third override signal in the event said heat sensing means malfunctions.

15. In a heavy load bearing motor vehicle having an engine, a coolant system, an air conditioning system, a fan and a fan clutch, an analogue electronic fan control circuit comprising:

heat sensing means for detecting the temperature of said coolant and generating a coolant temperature signal proportional thereto;

first temperature signal generating means in electrical contact with said heat sensing means for receiving the coolant temperature signal and generating a first temperature signal when the coolant temperature exceeds a first selected temperature;

second temperature signal generating means in electrical contact with said heat sensing means for receiving the coolant temperature signal and generating a second temperature signal when the coolant temperature exceeds a second selected temperature;

speed sensing means for detecting the motor vehicle road speed and generating a speed signal proportional thereto;

load sensing means for detecting the operation of said air conditioning system and generating a corresponding load signal;

first override signal generating means in electrical contact with said heat sensing means for receiving the coolant temperature signal and generating a first override signal when said heat sensing means malfunctions;

second override signal generating means in electrical contact with said speed sensing means and said load sensing means for receiving said speed and load signals and generating a second override signal when the vehicle road speed is less than a selected speed and the air conditioning system is engaged;

control signal generating means in electrical contact with said first and second temperature signal generating means and said first and second override signal generating means for receiving and distinguishing input signals, including said first and second temperature signals and said first and second override signals and generating a control signal in response to at least one of said input signals operative to engage and drive the fan at a constant speed, such that the required engine cooling is achieved.

16. A control circuit as in claim 15 wherein said fan clutch is air driven.

17. A control circuit as in claim 15 wherein said fan clutch is magnetic.

18. A control circuit as in claim 15 further comprising:

a voltage regulator in electrical contact with said heat sensing means, said first and second temperature signal generating means, said first and second override signal generating means, and said control signal generating means for converting input voltage, to 8 volts DC; and secondary heat sensing means in electrical contact with said control signal generating means for detecting a selected operating system temperature and generating a third override signal for receipt by said control signal generating means when said selected system temperature exceeds a third selected temperature.

19. A method of electronically controlling an engine fan in a heavy load bearing vehicle having an engine, an engine coolant system, an air conditioning system and a fan, comprising the steps of:

detecting the temperature of said engine coolant;

generating a coolant temperature signal proportional to said coolant temperature;

comparing the coolant temperature signal to a first selected temperature;

generating a first temperature signal when the coolant temperature exceeds said first selected temperature;

comparing said coolant temperature signal to a second selected temperature;

generating a second temperature signal when said coolant temperature exceeds said second selected temperature;

detecting the road speed of said motor vehicle;

generating a speed signal proportional to said vehicle speed;

detecting whether said air conditioning system is engaged;

generating a load signal corresponding to the air conditioning system load on said engine;

comparing said speed signal to a selected speed;

generating an override signal when said vehicle speed is less than said selected speed and said air conditioning system is operating;

providing control signal generating means for receiving and comparing input signals, including said first and second temperature signals and said override signal; and generating a control signal in response to at least one of said input signals operative to engage and drive the fan at a constant speed such that the required engine cooling is achieved.

20. A method as in claim 19 further comprising the steps of:

detecting the temperature of a selected vehicle operating system;

comparing the temperature of said selected operating system to a third selected temperature; and generating a secondary override signal for receipt by said control signal generating means when the temperature of said operating system exceeds said third selected temperature.

* * * * *